Sept. 12, 1961 O. B. SHAFER 2,999,918

ELECTRICAL CIRCUIT CONNECTOR APPARATUS

Filed Dec. 26, 1957

INVENTOR.
ORVILLE B. SHAFER

BY

Dewey J. Cunningham
ATTORNEY

2,999,918
ELECTRICAL CIRCUIT CONNECTOR APPARATUS

Orville B. Shafer, Owego, N.Y., assignor to International Business Machines Corporation, New York, N.Y., a corporation of New York Filed Dec. 26, 1957, Ser. No. 705,459
6 Claims. (Cl. 200—166)

The present invention relates to an electrical circuit assembly of the type having a plurality of spaced apart members supporting electrical circuitry, and more particularly to connector apparatus which may be selectively used to make desired connections between the circuitry on the members.

With the trend to obtain a maximum compactness in an electronic circuit assembly, the trend in circuit packaging has been away from the single layer chassis in which certain components are mounted on opposite sides thereof. Instead, the size of the chassis has been reduced for a given circuit assembly and several members are used in spaced apart, stacked relation for supporting the various electrical components and interconnecting wiring. With the new trend came the more difficult task of obtaining electrical interconnection between the circuitry on the various members. This is particularly true where an effort is made to space the members a minimum distance apart to obtain greater compactness.

While a small volume package is obtained with a stacked array of circuit members such as described above, considerable difficulty is encountered in an effort to service the assembly. One philosophy is to discard the entire assembly as it may be less expensive to build an entirely new assembly rather than disconnect several layers, make the proper repairs, and then reconnect them. While the throw-away philosophy may be more economical in certain instances, it is nonetheless a waste of equipment which should preferably be avoided.

Furthermore, in the construction of such circuit assemblies for experimental purposes, it is desirable to be able to make connections which may be made permanent and others which are less permanent. It may even be desirable to break the permanent connections for a time and then make the connections over again. All of this should be capable of accomplishment with a minimum of effort and time.

The present invention is similar to prior art devices in that it relates to an electrical assembly of the multi-layered type so as to have a minimum volume, but contrasts with such prior art structure in the manner which the electrical connections between the layers are made. Briefly, there is provided a plurality of clips which extend through plated holes in the edges of circuit supporting members and project outwardly from opposite sides thereof. The clips are made of a resilient conductive material and the free ends thereof are formed with a turned-in portion. The arrangement is such that the clips on adjacent circuit supporting members may selectively have no connection with each other or they may have their turned-in portions fit together in complementary fashion. A force on one of the clips causes the latching together of the aforementioned ends while a force in the same direction on the other clip unlatches said ends.

Accordingly, it is an object of the present invention to provide a new and improved arrangement for interconnecting the electrical circuitry on the different members of a three-dimensional circuit assembly.

Another object of the present invention is to provide a new and improved arrangement for electrically interconnecting two or more electrical circuit supporting members.

Still another object of this invention is to furnish a new and improved means for mounting complex electronic circuitry in an interconnected layer-like fashion whereby the layers may be placed in close proximity in order to obtain a minimum volume circuit package, or may be disconnected and a layer removed for maximum accessibility to the circuit for servicing.

Still another object of the invention is to provide a flexible means of connection, as described above, for both experimental and production models of complex electronic circuitry.

A further object of the present invention is to provide a new and improved circuit connection arrangement which is specially adapted for automation assembly techniques.

A still further object of the present invention is to furnish a new and improved spring clip arrangement for providing electrical communication between spaced apart circuit assemblies, said arrangement including two separate members which are adapted such that an application of a force to one of the members will latch the members together, and the application of a force to the other of the members will serve to unlatch them.

Other objects of the invention will be pointed out in the following description and claims and illustrated in the accompanying drawings, which disclose, by way of examples, the principle of the invention and the best mode, which has been contemplated, of applying that principle.

Figure 1:
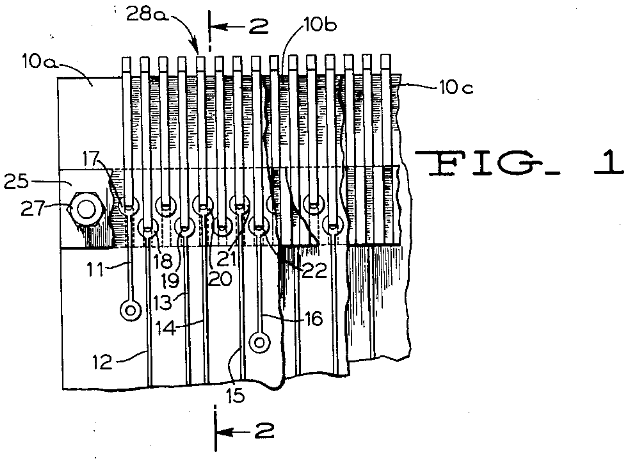
FIG. 1 is a plan view of the present invention with a portion thereof broken away to show the manner in which a plurality of circuit connectors are mounted in the circuit boards.
Figure 2:
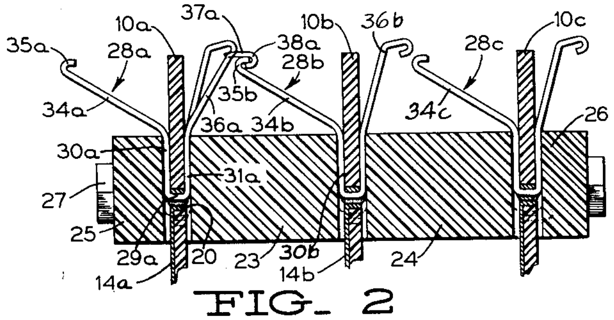
FIG. 2 is a sectional view taken on lines 2—2 of FIG. 1.

Referring to FIGS. 1 and 2 of the drawings, there is shown a plurality of circuit supporting members 10*a*, 10*b* and 10*c*. These members are normally constructed of an insulating material and may be referred to as circuit boards. They are adapted to have metallized conductors thereon which may be produced in any suitable fashion. For example, board 10*a* has the conductors 11 through 16 thereon which are adapted respectively to extend to perforations or holes 17 through 22. Each of these holes has its wall plated with a conductive material such that an electrical connection is afforded with the conductor extending thereto on the circuit supporting member. It will be noted that the holes aforementioned are arranged in staggered spaced apart relationship. This permits a greater number of holes to be provided.

The boards 10*a* and 10*b* are held in a spaced relationship by spacer 23 while boards 10*b* and 10*c* are separated by a spacer 24. The members 25 and 26 are placed on the front and back sides of the assembly. A suitable rod 27 is adapted to extend through member 25, board 10*a*, spacer 23, board 10*b*, spacer 24, board 10*c* and member 26 for holding the assembly together. It will be understood that only a portion of an entire assembly is shown and that other rods may be furnished where it is deemed appropriate to assure rigidity.

Prior to the time the boards 10*a*, 10*b* and 10*c* are assembled together each of the holes previously mentioned, as well as similar holes in boards 10*b* and 10*c*, is adapted to receive a resilient spring clip connector. One of the connectors on board 10*a* in FIG. 1 is provided generally with reference numeral 28*a*. As shown in FIG. 2, the related connectors on boards 10*b* and 10*c* are respectively provided generally with reference numerals 28*b* and 28*c*. Inasmuch as the resilient clip connectors are all the same, a detailed description will be given only of connector 28*a*. Similar reference numerals will be applied to similar parts on connectors 28*b* and 28*c* except that the suffixes *b* and *c* will be used with the numerals.

Figure 3:
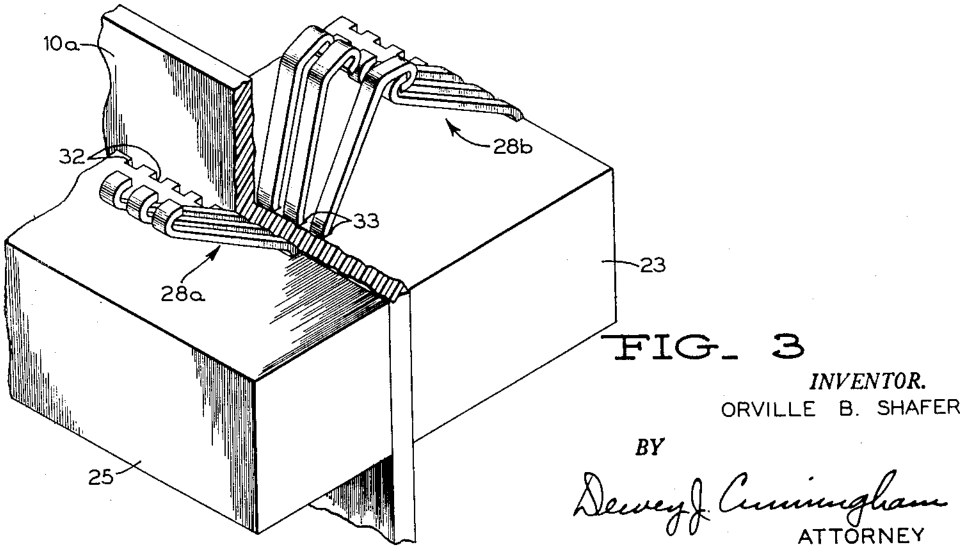
FIG. 3 is a partial isometric view of the present invention.

As shown in FIGS. 2 and 3, the connector 28*a* is generally U-shaped in that it has a base 29*a* having parallel legs 30*a* and 31*a* connected thereto and adapted to lie adjacent opposite sides of board 10*a*. The legs 30*a* and 31*a* are adapted to fit in grooves 32 and 33, respectively, in members 25 and 23, respectively, said grooves being best seen in FIG. 3. The upper portion of leg 30*a* is bent to form a diagonal portion 34*a*, the free end of the latter portion being turned in as at 35*a*. The upper portion of leg 31 *a* is bent to form a diagonal portion 36*a*. Near the free end of portion 36*a*, there is a first bend to form a portion 37*a* and a second bend to form a turned-in portion 38*a*.

The base 29*a* of the connector is adapted to be secured to the plated wall of hole 20 in a suitable manner so that it is electrically connected to the plated wall and to conductor 14. For example a solder connection may be used.

In utilizing the present invention, let it be assumed that it is desired to make a connection between conductor 14*a* on board 10*a* and a conductor 14*b* on board 10*b*. It is but necessary to apply a pressure to the upper side of the diagonal portion 36*a* in the direction of spacer 23. First, the turned-in portion 38*a* of connector 28*a* engages the turned-in portion 35*b* of connector 28*b*, thereby urging the portion 35*b* also toward spacer 23. As soon as the free end of portion 38*a* slides past the free end of portion 35*b*, the pressure on the diagonal portion 36*a* may be removed and the engaging turned-in portions will be locked together in complementary fashion. This connection may be used for checking out the circuit connections and may later be made permanent by a soldering operation.

Inasmuch as the holes in the boards are in spaced staggered relation, the legs 30*a* and 31*a* for clip 28*a* will be shorter than similar legs associated with the connector which is adapted to be associated with hole 19, for example.

From the above, it should be apparent that the remaining connectors on the boards 10*a*, 10*b* and 10*c* may be used to make connections where desired to form a particular circuit configuration for the entire assembly. If it becomes necessary to trouble-shoot the assembly, a connection may be easily broken. For example, if a hot soldering iron is applied to the upper side of the diagonal portion 34*b* in the direction of spacer 23, the solder connection between the turned-in portions 38*a* and 35*b* will be broken. Further pressure will allow the turned-in portion 38*a* to return to its original position above the turned-in portion 35*b*. Of course, if the turned-in portions are not soldered together, then it is unnecessary to use a hot member in applying the pressure to the diagonal portion 34*b*.

From the above detailed description it will be apparent that I have provided a new and improved connector for interconnecting the electrical circuitry on the different members of a three-dimensional circuit assembly. The circuits may be as complex as desired and yet provide an arrangement whereby a minimum volume circuit is required. The connections may be simply made and broken. The breaking of a connection is simple even though the connections may be soldered. With the present invention, it is easy to break all circuit connections between two boards for accessibility to the components therebetween, whereby servicing is simplified.

Furthermore, with this arrangement, the connections may be easily automated. That is, a plurality of fingers (not shown) may be used to apply pressure to predetermined ones of the diagonal members such as 34*a*, 34*b* and 34*c* simultaneously. Thus, all connections may be made at once.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. Apparatus for electrically interconnecting the electrical circuitry on a plurality of separate spaced apart circuit supporting members, said apparatus comprising a plurality of resilient generally U-shaped members mounted on first and second circuit supporting members, each of said U-shaped members having a pair of legs connected by a base, the bases of said U-shaped members being received by apertures in said first and second circuit supporting members so as to be connected to the electrical circuitry thereon, the legs of each U-shaped members extending along opposite sides of the circuit supporting member upon which it is mounted from the said base and then diagonally outwardly away from said opposite sides, and turned-in portions on the free ends of each of said legs, one of the legs on said first circuit supporting member being adapted to be latched to one of the legs on said second supporting member by way of the turned-in portions on the free ends thereof.

2. Apparatus for selectively making electrical connections between the electrical circuitry comprising conductors on a plurality of spaced circuit supporting members, spacer means adjacent a selected edge of adjacent ones of a plurality of circuit supporting members for maintaining a spaced relation therebetween, first and second ones of said circuit supporting members having apertures adjacent said selected edge, said apertures being positioned adjacent the spacer means between said first and second circuit supporting members, a plurality of resilient generally U-shaped connector members, each of said U-shaped members having a pair of legs connected by a base, the base of each of said U-shaped members being received by a separate one of the apertures in said first and second circuit supporting members, said base being connected to a conductor on the member in which it is received, the legs of each U-shaped member extending outwardly from said base along the opposite sides of the circuit supporting member upon which it is mounted toward said selected edge to a point where they bend outwardly away from said circuit supporting member upon which they are mounted, and means on the free ends of the legs of said U-shaped members between said first and second circuit supporting members whereby said free ends may be selectively latched together.

3. Apparatus for electrically interconnecting the electrical circuitry on a plurality of separate spaced apart circuit supporting members, said apparatus comprising a plurality of resilient generally U-shaped members mounted on first and second ones of a plurality of circuit supporting members, each of said U-shaped members having a pair of legs connected by a base, the bases of said U-shaped members being received by apertures in said first and second circuit supporting members so as to be connected to the electrical circuitry thereon, the legs of each U-shaped member extending from the said base along opposite sides of the circuit supporting member upon which they are mounted and then diagonally outwardly away from said opposite sides, and means formed on the free ends of each of said legs whereby a force applied to the diagonal portion on one of the legs on said first circuit supporting member will cause the said leg to be latched to one of the legs on said second circuit supporting member.

4. Apparatus for electrically interconnecting the electrical circuitry on a plurality of separate spaced apart circuit supporting members, said apparatus comprising a plurality of resilient generally U-shaped members mounted on first and second spaced circuit supporting members, each of said U-shaped members having a pair of legs connected by a base, the bases of said U-shaped members being received by apertures in said first and second circuit supporting members so as to be connected to the electrical circuitry thereon, the legs of each U-shaped member extending from the said base along opposite sides of the circuit supporting member upon which they are mounted and then diagonally outwardly away from said opposite sides, and means formed on the free ends of each of said legs whereby the free end of a leg on one circuit supporting member may be latched to one of the legs on said second circuit supporting member.

5. Apparatus for electrically interconnecting the electrial circuitry on a plurality of separate spaced apart circuit supporting members, said apparatus comprising a plurality of resilient generally U-shaped members mounted on first and second spaced circuit supporting members, each of said U-shaped members having a pair of legs connected by a base, the bases of said U-shaped members being received by apertures in said first and second circuit supporting members so as to be connected to the electrical circuitry thereon, the legs of each U-shaped member extending from the said base along opposite sides of the circuit supporting member upon which they are mounted and then diagonally outwardly away from said opposite sides, and turned-in portions on the free ends of each of said legs, one of the legs on said first circuit supporting member being adapted to be latched to one of the legs on said second supporting member by way of the turned-in portions on the free ends thereof, said turned-in portions on said legs which are adapted to be latched together being formed such that a force applied to one of the latched legs will unlatch said legs.

6. Apparatus for selectively making electrical connections between the electrical circuitry comprising conductors on a plurality of spaced circuit supporting members, spacer means adjacent a selected edge of adjacent ones of a plurality of circuit supporting members for maintaining a spaced relation therebetween, first and second ones of said circuit supporting members having apertures adjacent said selected edge, said apertures being positioned adjacent the spacer means between said first and second circuit supporting members, a plurality of resilient generally U-shaped connector members, each of said U-shaped members having a pair of legs connected by a base, the base of each of said U-shaped members being received by a separate one of the apertures in said first and second circuit supporting members, said base being connected to a conductor on the member in which it is received, the legs of each U-shaped member extending outwardly from said base along the opposite sides of the circuit supporting member upon which they are mounted toward said selected edge to a point where they bend outwardly away from said circuit supporting member upon which they are mounted, and means on the free ends of the legs of said U-shaped members between said first and second circuit supporting members whereby sets of legs through said free ends may be selectively latched together, the last-named means comprising complementary turned-in portions on the free ends of said legs which are formed such that a force on one leg of a set of legs to be latched together will cause the set of legs to be latched together and a force on the other leg of said set will cause the set of legs to be unlached.

References Cited in the file of this patent

UNITED STATES PATENTS

| | | |
|---|---|---|
| 1,319,760 | Dalitz | Oct. 28, 1919 |
| 2,579,141 | Eckert | Dec. 18, 1951 |
| 2,701,346 | Powell | Feb. 1, 1955 |